(12) United States Patent
Kim

(10) Patent No.: US 10,843,732 B2
(45) Date of Patent: Nov. 24, 2020

(54) REMOTE CONTROL DEVICE, REMOTE PARKING ASSIST SYSTEM USING THE SAME, AND METHOD FOR CONTROLLING THE SYSTEM

(71) Applicants: HYUNDAI MOTOR COMPANY, Seoul (KR); KIA MOTORS CORPORATION, Seoul (KR)

(72) Inventor: Yun Sik Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 38 days.

(21) Appl. No.: 16/200,253

(22) Filed: Nov. 26, 2018

(65) Prior Publication Data
US 2020/0062308 A1 Feb. 27, 2020

(30) Foreign Application Priority Data
Aug. 23, 2018 (KR) .................. 10-2018-0098572

(51) Int. Cl.
| | |
|---|---|
| B62D 15/02 | (2006.01) |
| B60W 30/06 | (2006.01) |
| G05D 1/00 | (2006.01) |
| G08G 1/16 | (2006.01) |
| G06K 9/00 | (2006.01) |
| B60W 10/04 | (2006.01) |
| B60W 10/20 | (2006.01) |
| B60W 30/08 | (2012.01) |

(Continued)

(52) U.S. Cl.
CPC ......... *B62D 15/0285* (2013.01); *B60W 30/06* (2013.01); *G05D 1/0016* (2013.01); *G06K 9/00812* (2013.01); *G08G 1/168* (2013.01); *B60W 10/04* (2013.01); *B60W 10/18* (2013.01); *B60W 10/20* (2013.01); *B60W 30/08* (2013.01); *B60W 2420/42* (2013.01); *B60W 2420/52* (2013.01); *G05D 1/0238* (2013.01); *G05D 1/0278* (2013.01); *G05D 2201/0213* (2013.01)

(58) Field of Classification Search
None
See application file for complete search history.

(56) References Cited

U.S. PATENT DOCUMENTS

| | | |
|---|---|---|
| 9,946,255 B2 | 4/2018 | Matters et al. |
| 2018/0037262 A1 | 2/2018 | Imai |

(Continued)

FOREIGN PATENT DOCUMENTS

| | | |
|---|---|---|
| JP | 2016-185745 A | 10/2016 |
| KR | 10-2018-0045470 A | 5/2018 |

*Primary Examiner* — Tamara L Weber
(74) *Attorney, Agent, or Firm* — Morgan, Lewis & Bockius LLP

(57) ABSTRACT

A remote control device includes: a user input device that receives a user input; a display that displays a user interface for controlling torque of a power source of a vehicle; a communication device in wireless communication with a remote parking assist system; and a processor that operates the user interface in response to the user input and transmits a control signal according to an operation of the user interface to the remote parking assist system. The processor resizes a component of the user interface and displays the resized component when the vehicle is immovable while the remote parking assist system is in operation.

20 Claims, 14 Drawing Sheets

(51) Int. Cl.
   *G05D 1/02*   (2020.01)
   *B60W 10/18*   (2012.01)

(56)            References Cited

U.S. PATENT DOCUMENTS

2018/0111608 A1     4/2018  Kim
2018/0111609 A1     4/2018  Woo
2019/0375381 A1*   12/2019  Nakagawa .............. B60T 7/045
2020/0041992 A1*    2/2020  Nagashima ........... B60W 30/06

* cited by examiner

REMOTE CONTROL DEVICE, REMOTE PARKING ASSIST SYSTEM USING THE SAME, AND METHOD FOR CONTROLLING THE SYSTEM

CROSS-REFERENCE TO RELATED APPLICATION

This application is claims the benefit of priority to Korean Patent Application No. 10-2018-0098572, filed in the Korean Intellectual Property Office on Aug. 23, 2018, the entire contents of which are incorporated herein by reference.

TECHNICAL FIELD

The present disclosure relates to a remote control device that assists a driver to control a parking process using the remote control device outside a vehicle, a remote parking assist system using the remote control device, and a method for controlling the remote parking assist system.

BACKGROUND

A remote smart parking assist (RSPA) system is a system that searches for a parking space via ultrasonic sensors mounted at the front and the back of a vehicle and automatically assists in parking the vehicle in the parking space found and retrieving the vehicle therefrom. The RSPA system enables a driver to park the vehicle simply by operating a smart key outside the vehicle.

The RSPA system imposes a restriction on the maximum output torque of an engine in order to prevent a collision with an obstacle due to limits on detection performance of the ultrasonic sensors and braking performance. Therefore, in the case where a road has a step thereon or the road grade is beyond a threshold value or cannot be accurately estimated, the vehicle may be immovable even though the RSPA system controls the engine to output the maximum torque. In this case, the actual availability of the RSPA system may be deteriorated since the RSPA system recognizes a control limit situation according to the immovable state of the vehicle and releases the RSPA function.

SUMMARY

The present disclosure has been made to solve the above-mentioned problems occurring in the prior art while advantages achieved by the prior art are maintained intact.

An aspect of the present disclosure provides a remote control device that assists a driver to control a parking process using the remote control device outside a vehicle, a remote parking assist system using the remote control device, and a method for controlling the remote parking assist system.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a remote control device includes: a user input device that receives a user input; a display that displays a user interface for controlling torque of a power source of a vehicle; a communication device in wireless communication with a remote parking assist system; and a processor that operates the user interface in response to the user input and transmits a control signal according to an operation of the user interface to the remote parking assist system. The processor resizes a component of the user interface and displays the resized component when the vehicle is immovable while the remote parking assist system is in operation.

The user interface may include a slide object and a slide bar that guides a sliding range of the slide object.

The processor may extend the sliding range by an extension region in a longitudinal direction of the slide bar when the vehicle is immovable while the remote parking assist system is in operation.

The processor may resize the extension region based on a current speed of the vehicle.

The processor may additionally extend the extension region when the current speed of the vehicle is lower than or equal to a target speed.

The processor may reduce the extension region when the current speed of the vehicle exceeds a target speed and is lower than or equal to a threshold speed.

The processor may release the extension region when the current speed of the vehicle exceeds a threshold speed.

The processor may move the slide object into the extension region in response to the user input and may transmit, to the remote parking assist system, a control command that instructs output of additional torque that matches the corresponding position of the slide object.

According to another aspect of the present disclosure, a remote parking assist system includes: a communication device in wireless communication with a remote control device; a vehicle sensor that detects information about surroundings of a vehicle; a vehicle controller that controls behavior of the vehicle; and a processor that transmits notification of an immovable state of the vehicle to the remote control device and controls the behavior of the vehicle according to a control signal transmitted from the remote control device when the vehicle is immovable during autonomous parking based on the information about the surroundings. The remote control device resizes a component of a user interface for controlling torque of a power source of the vehicle when receiving the notification of the immovable state of the vehicle.

The vehicle sensor may include an ultrasonic sensor, a wheel speed sensor, a wheel pulse sensor, and a camera.

The processor may determine a control range of the user interface according to a current speed of the vehicle.

The processor may immediately stop the vehicle and may release the immovable state of the vehicle when a current speed of the vehicle exceeds a threshold speed.

According to another aspect of the present disclosure, a method for controlling a remote parking assist system includes: recognizing, by a processor, an immovable state of a vehicle and transmitting notification of the immovable state of the vehicle to a remote control device by the remote parking assist system in operation; resizing, by the processor, a component of a user interface for controlling torque of a power source of the vehicle by the remote control device; transmitting, by the processor, a control signal according to an operation of the resized user interface to the remote parking assist system by the remote control device; and controlling, by the processor, behavior of the vehicle by adjusting the torque of the power source according to the control signal by the remote parking assist system.

The resizing of the component of the user interface may include extending a slide bar of the user interface by an extension region in a longitudinal direction of the slide bar by the remote control device, which the user interface includes a slide object that moves along the slide bar.

The method may further include comparing a current speed of the vehicle with a target vehicle speed and a threshold vehicle speed by the remote parking assist system after the controlling of the behavior of the vehicle.

The remote control device may reduce the extension region when the current speed of the vehicle exceeds the target vehicle speed and is lower than or equal to the threshold vehicle speed.

The remote control device may release the extension region when the current speed of the vehicle exceeds the threshold vehicle speed.

The remote control device may additionally extend the extension region when the current speed of the vehicle is lower than or equal to the target vehicle speed.

The controlling of the behavior of the vehicle may include instructing the remote parking assist system to output an amount of additional torque matching a position of the slid object by the remote control device when the slide object is located in the extension region.

The method may further include releasing the immovable state of the vehicle by the remote parking assist system when the resized user interface is not operated after the resizing of the component of the user interface.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

A remote parking assist system controls behavior of a vehicle depending on on/off states of a remote parking assist function control button on a smart key or a center console when a user turns on/off the button. The remote parking assist system recognizes surroundings of the vehicle via sensors mounted on the vehicle, calculates maximum torque for ensuring safety for the recognized surroundings, and controls output torque of a power source, with the button in a turned-on state. In contrast, the remote parking assist system temporarily stops the vehicle when the button is turned off. In the case where there is a steep hill or a step on a road when the remote parking assist system is used, the vehicle may be unable to move with the maximum torque determined by itself, and the use of the remote parking assist function may be restricted even without obstacles around the vehicle and the risk of a collision of the vehicle since the user cannot execute an additional operation.

To solve the above-mentioned problems, the present disclosure is aimed at enabling the user to control the output torque of the power source of the vehicle when the vehicle cannot move with the maximum torque calculated by the remote parking assist system.

Figure 1:
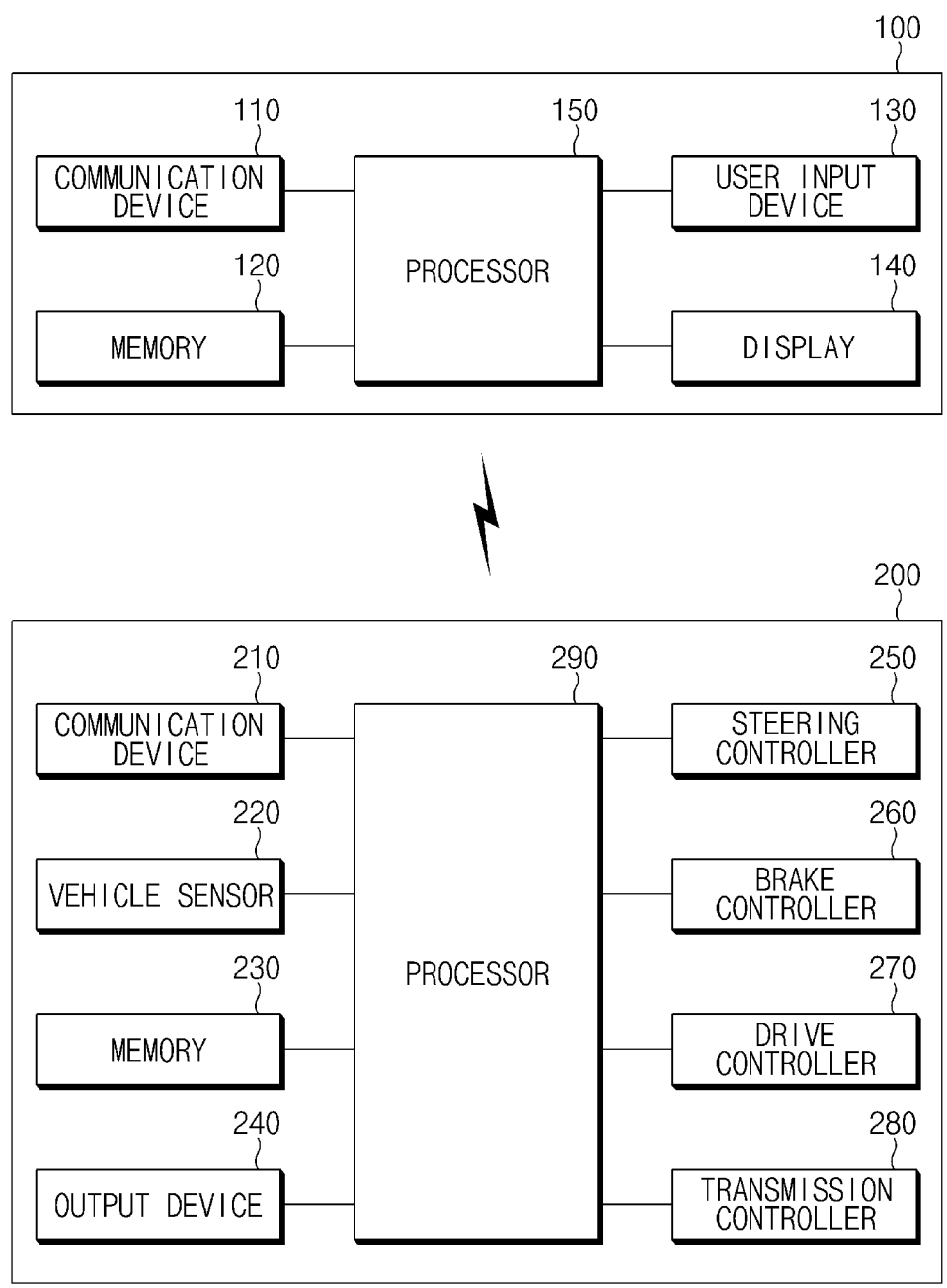
FIG. 1 is a block diagram illustrating a remote parking assist system using a remote control device according to an embodiment of the present disclosure.
Figure 2A:
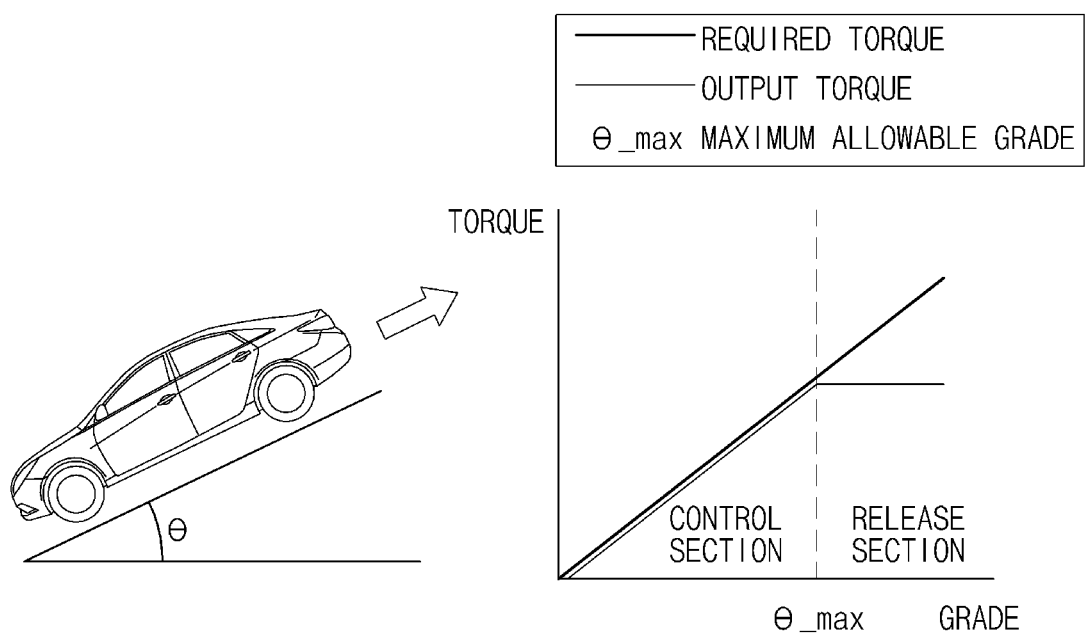
FIGS. 2A to 2C are views illustrating immovable states of a vehicle according to a detection limit of a sensor.
Figure 2B:
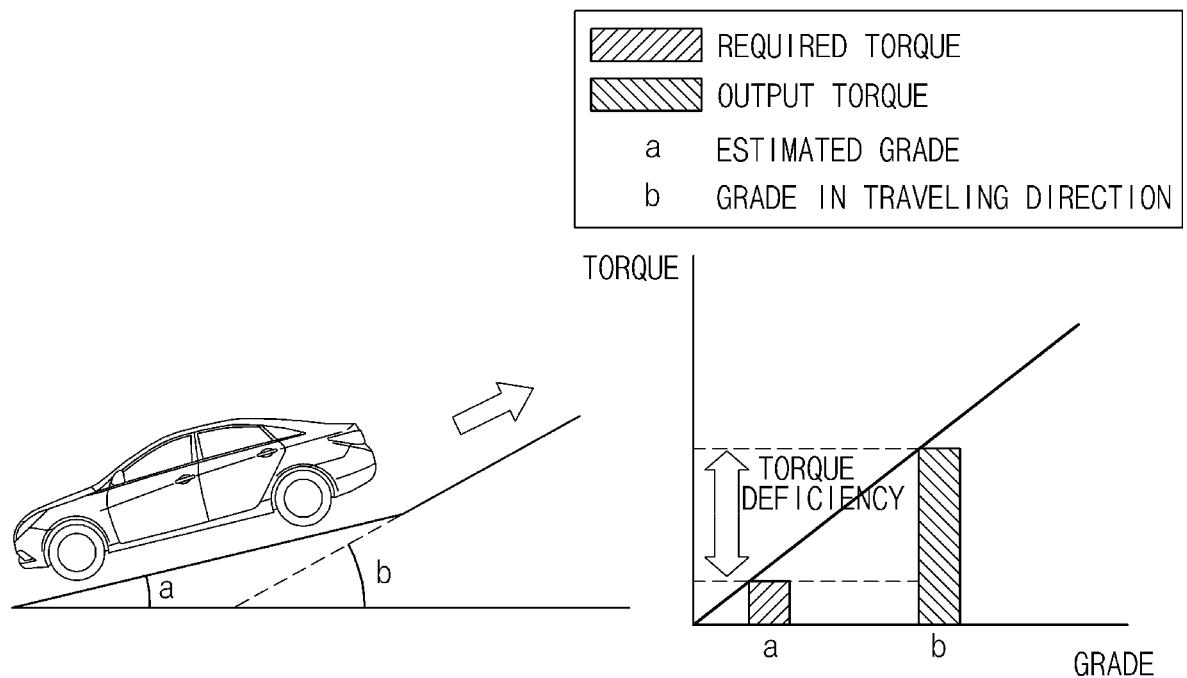
Figure 2C:
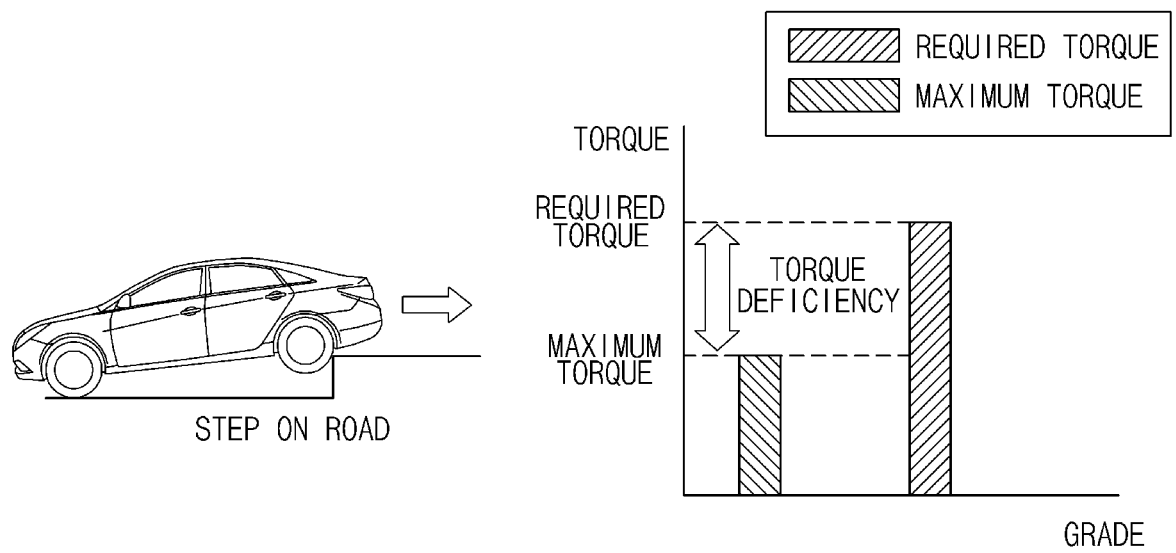
Figure 3:
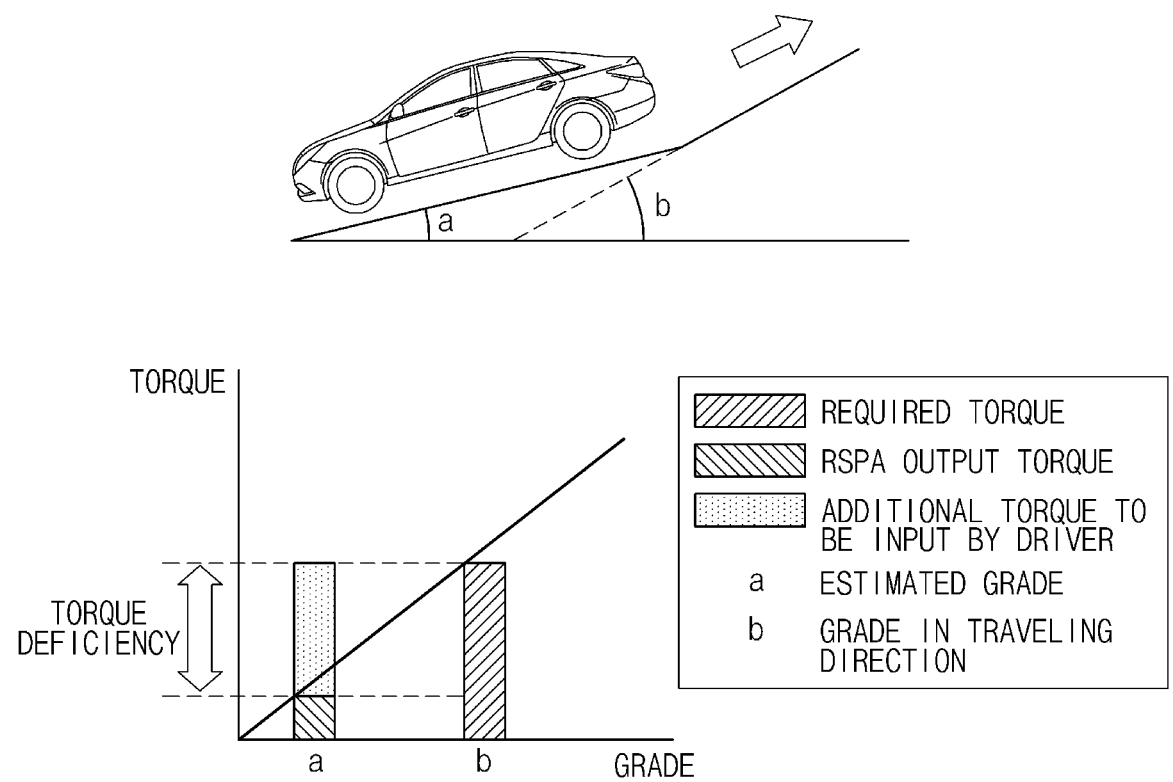
FIG. 3 is a view illustrating an operation of overcoming a road grade limit by inputting additional torque according to an embodiment of the present disclosure.

FIG. 1 is a block diagram illustrating a remote parking assist system 200 using a remote control device 100 according to an embodiment of the present disclosure. FIGS. 2A to 2C are views illustrating immovable states of a vehicle according to a detection limit of a sensor. FIG. 3 is a view illustrating an operation of overcoming a road grade limit by inputting additional torque according to an embodiment of the present disclosure.

As illustrated in FIG. 1, the remote control device 100 may exchange data (e.g., information, control commands, and/or control signals) with the remote parking assist system 200, which is mounted in the vehicle, via a wireless network. The wireless network may be implemented by a wireless internet technology, a short-range communication technology, and/or a mobile communication technology. The wireless internet technology may include wireless LAN (WLAN) (e.g., WiFi), wireless broadband (Wibro), and/or world interoperability for microwave access (Wimax). The short-range communication technology may include Bluetooth, near field communication (NFC), radio frequency identification (RFID), RF communication, and/or low frequency (LF) communication. The mobile communication technology may include code division multiple access (CDMA), global system for mobile communication (GSM), long term evolution (LTE), and/or LTE-advanced.

The remote control device 100 may be an electronic device that can be carried by a user. The remote control device 100 may be implemented with a smart key, a display smart key, a smartphone, a tablet PC, a personal digital assistant (PDA), a portable multimedia player (PMP), and/or a notebook computer.

The remote control device 100 may include a communication device 110, memory 120, a user input device 130, a display 140, and a processor 150.

The communication device 110 may wirelessly communicate with the remote parking assist system 200. The communication device 110 may transmit a control signal for controlling the vehicle's behavior to the remote parking assist system 200. The control signal may be a signal for locking doors, unlocking the doors, starting the vehicle, enabling a remote parking assist function, stopping (disabling) the remote parking assist function, moving the vehicle forward or backward, or stopping the vehicle.

The memory 120 may store a program for an operation of the processor 150 and may also temporarily store input/output data. The memory 120 may store a mapping table for mapping a control signal (a control command) according to a user input. The memory 120 may store predetermined setting information.

The memory 120 may be implemented with at least one storage medium (recording medium) among storage mediums such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), and a register.

The user input device 130 may receive a user input and may generate data corresponding to a user operation. The user input device 130 may include a key pad, a dome switch, a button, a touch pad, a jog wheel, and/or a jog switch.

The display 140 may display a status and an outcome of processing according to an operation of the processor 150. The display 140 may display a user interface (UI) that is implemented with computer graphics. The user interface may include a slide object and a slide bar that guides a sliding range (an allowable sliding range) of the slide object. The slide object may move along the slide bar.

The display 140 may be implemented in the form of any one of a liquid crystal display (LCD), a thin film transistor-liquid crystal display (TFT LCD), an organic light-emitting diode (OLED) display, a flexible display, a three-dimensional (3D) display, a transparent display, and a touch screen.

The display 140 may also include a sound output module, such as a speaker, which is capable of outputting audio data. For example, the display 140 may output an alert sound when the battery level of the remote control device 100 is low or when the vehicle is immovable at the maximum torque output by the remote parking assist system 200.

The display 140, along with the user input device 130, may be implemented as a touch screen and may be used as an input device as well as an output device. In this case, a touch sensor, such as a touch film or a touch pad, may be used as the user input device 130.

The processor 150 may control an overall operation of the remote control device 100. The processor 150 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

When the remote control device 100 is not used for a preset period of time, the processor 150 may switch the operating mode of the remote control device 100 to a sleep mode (a power saving mode). When a wake-up button of the user input device 130 is pressed, the processor 150 may switch the operating mode from the sleep mode to a standby mode in which the remote control device 100 is ready to receive an input.

The processor 150 may operate the user interface in response to a user input. The processor 150 may transmit a control signal corresponding to the operation of the user interface to the remote parking assist system 200 via the communication device 110 with reference to the mapping table stored in the memory 120. The processor 150 may detect the position of the slide object on the slide bar and may transmit a control signal corresponding to the detected position of the slide object to the remote parking assist system 200. For example, the processor 150 may transmit a stop command to the remote parking assist system 200 when the slide object is located at the center of the slide bar. The processor 150 may transmit a drive command when the slide object is located at one end of the slide bar and a reverse command when the slide object is located on the other end of the slide bar.

The processor 150 may resize the components of the user interface when receiving notification of an immovable state of the vehicle from the remote parking assist system 200. The processor 150 may extend the slide bar in the longitudinal direction of the slide bar, based on the predetermined setting information. In other words, the processor 150 may extend the sliding range of the slide object by a preset extension region (extension range).

After the extension of the slide bar, the processor 150 may additionally extend or reduce the extended region in the longitudinal direction of the slide bar according to an instruction of the remote parking assist system 200. In other words, the processor 150 may additionally extend or reduce the extended sliding range.

The processor 150 may detect the position of the slide object in the extended region of the slide bar in response to a user input. Based on the position of the slide object, the processor 150 may transmit a control command that instructs a power source to output additional torque, to the remote parking assist system 200.

The remote parking assist system 200 may include a communication device 210, a vehicle sensor (a detector) 220, memory 230, an output device 240, a steering controller 250, a brake controller 260, a drive controller 270, a transmission controller 280, and a processor 290.

The communication device 210 may wirelessly communicate with the remote control device 100. The communication device 210 may transmit notification of an immovable state of the vehicle and/or an allowable additional torque range to the remote control device 100. Further, the communication device 210 may receive a control signal (a control command) from the remote control device 100.

The vehicle sensor 220 may obtain information about surroundings of the vehicle (e.g., a road grade, a road condition, an obstacle position, and/or an obstacle size) and information about the vehicle (e.g., the vehicle speed, the steering angle, and/or the gear position) using at least one sensor mounted in the vehicle. The vehicle sensor 220 may include an ultrasonic sensor, a camera, a wheel speed sensor, and a wheel pulse sensor.

The ultrasonic sensor may generate ultrasonic waves to detect objects (e.g., obstacles, vehicles, and persons) around the vehicle and may measure the distances between the vehicle and the surrounding objects. Distance sensors such as radio detecting and ranging (radar) and light detection and ranging (LiDAR), in addition to the ultrasonic sensor, may be used to measure the distances between the vehicle and the surrounding objects. The radar may generate electromagnetic waves, receive electromagnetic waves reflected by the objects around the vehicle, and determine the distances from the surrounding objects and the directions and altitudes thereof. The LiDar may send out laser pulses, measure arrival times of laser pulses reflected by the surrounding objects, and calculate the spatial coordinates of the reflection points to determine the distances from the surrounding objects and the shapes thereof.

The camera may be mounted at the front, the back, and the side of the vehicle and may obtain images of the surroundings of the vehicle. The camera may be implemented with at least one image sensor among images sensors such as a charge coupled device (CCD) image sensor, a complementary metal oxide semiconductor (CMOS) image sensor, a charge priming device (CPD) image sensor, and a charge injection device (CID) image sensor. The camera may also be implemented with a surround view monitor.

The wheel speed sensor may be mounted on each wheel of the vehicle and may measure the rotating speed of the wheel. The wheel pulse sensor may count protrusions (cogs) on the outer edge of a pulse ring secured to the vehicle wheel. The data measured by the wheel speed sensor and the wheel pulse sensor may be used to calculate the speed and the travel distance of the vehicle.

The vehicle sensor 220 may further include a steering angle sensor, a gear position sensor, and a position sensor. The steering angle sensor may measure the steering angle of the vehicle. The steering angle sensor may be mounted in a steering column switch cluster and may measure the angle of rotation of a steering wheel. The gear position sensor may detect the position of a selector lever (gear information, that is, parking (P), drive (D), neutral (N), or reverse (R)) according to a user operation and may detect the driving state (a forward movement, a backward movement, or a stop) of the vehicle. The position sensor may be a global positioning system (GPS) receiver and may calculate the current position of the vehicle using signals transmitted from a GPS satellite.

The memory 230 may store a program for controlling an overall operation of the processor 290, a parking path generation algorithm, a power-source torque calculation algorithm, and/or a parking control algorithm. The memory 230 may also store input data and/or output data of the processor 290.

The memory 230 may be implemented with at least one storage medium (recording medium) among storage mediums such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a detachable disk, and web storage.

The output device 240 may output a status and an outcome of processing according to an operation of the processor 150 as visual information and/or auditory information. The output device 240 may be implemented with an infotainment system, a navigation terminal, and/or an audio video navigation (AVN).

The output device 240 may include a display and a sound output module. The display may be implemented with a liquid crystal display (LCD), a thin film transistor-liquid crystal display (TFT LCD), an organic light-emitting diode (OLED) display, a flexible display, a three-dimensional (3D) display, a transparent display, a head-up display (HUD), and/or a touch screen. The sound output module may output audio data stored in the memory 230. The sound output module may include a receiver, a speaker, and/or a buzzer.

The steering controller 250 may control the vehicle's steering. The steering controller 250 may be implemented by motor drive power steering (MDPS). The steering controller 250 may control the vehicle's steering angle under the control of the processor 290.

The brake controller 260 may control speed reduction of the vehicle. The brake controller 260 may be implemented by electronic stability control (ESC). The brake controller 260 may control brake pressure according to the position of a brake pedal or under the control of the processor 290.

The drive controller 270 may control the power source (e.g., an engine or a motor) of the vehicle. The drive controller 270 may control acceleration of the vehicle. The drive controller 270 may be implemented with an engine control unit (ECU) (an engine management system), a motor control unit (MCU), and/or a hybrid control unit (HCU). The drive controller 270 may control the driving torque (the output torque) of the power source according to acceleration pedal position information that is output from an acceleration pedal position sensor. The drive controller 270 may control the driving torque output of the power source to follow the travel speed of the vehicle that is requested by the processor 290.

The transmission controller 280 may control the vehicle's transmission. The transmission controller 280 may be implemented with a transmission control unit (TCU). The transmission controller 280 may control the vehicle's transmission according to the gear position and the gear status range.

The steering controller 250, the brake controller 260, the drive controller 270, and the transmission controller 280 described above may be collectively referred to as a vehicle controller. The vehicle controller may control steering, deceleration, acceleration, and/or transmission of the vehicle according to an instruction of the processor 290 during autonomous parking.

The processor 290 may exchange data with the vehicle sensor 220, the output device 240, the steering controller 250, the brake controller 260, the drive controller 270, and the transmission controller 280 via a vehicle network. The vehicle network may be implemented with a controller area network (CAN), a media oriented systems transport (MOST) network, a local interconnect network (LIN), and/or an x-by-wire (Flexray).

The processor 290 may turn on or off a remote parking assist function in response to a control signal according to an operation of the remote control device 100 or an operation device (not illustrated) inside the vehicle. The processor 290 may control the vehicle's behavior according to a control command, such as a drive, reverse, parking, or stop command, which is input by the user while the remote parking assist function is turned on (enabled). The processor 290 may instruct the vehicle controller 250 to 280 to recognize surroundings of the vehicle via the vehicle sensor 220 and control the vehicle's behavior in view of the surroundings recognized.

The processor 290, when detecting an obstacle around the vehicle via the vehicle sensor 220, may control the vehicle's behavior to avoid the obstacle detected, or may stop the vehicle to prevent a collision with the corresponding obstacle. Further, the processor 290 may control the vehicle's behavior by calculating the driving torque (the output torque) of the power source according to a road condition (e.g., a step on a road or a road grade). When controlling the vehicle to move forward or backward, the processor 290 may measure the grade of the road on which the vehicle moves, via the vehicle sensor 220. The processor 290 may calculate the output torque of the power source based on the road grade measured.

The output torque of the power source may increase with an increase in the road grade. The increase in the output torque may cause a collision of the vehicle with an obstacle. Therefore, the processor 290 may limit the maximum road grade that the remote parking assist function supports. As illustrated in FIG. 2A, when a road grade exceeds the maximum allowable grade $\theta\_max$, the vehicle may be unable to move using the remote parking assist function. In other words, even if the required torque calculated based on the road condition exceeds the required torque (the maximum output torque) at the maximum allowable grade $\theta\_max$, the processor 290 may restrict the output torque of the power source to the maximum output torque that the remote parking assist function supports.

When the processor 290 cannot detect a road grade variation via the vehicle sensor 220, the processor 290 may control the vehicle's behavior without reflecting the amount of required torque that corresponds to the road grade variation. When a road grade is changed from "a" to "b" as illustrated in FIG. 2B, the processor 290 may control the drive controller 270 with the output torque calculated based on the road grade "a" to allow the vehicle to proceed to the road with a road grade of "b". However, due to a torque deficiency, the vehicle may be unable to move at the point where the road grade is changed to "b".

As illustrated in FIG. 2C, the vehicle's wheels may be stopped by a step or an obstacle on a road. In this case, the vehicle may not overcome the step or the obstacle on the road and thus may be unable to move even though the power source outputs the maximum torque that the remote parking assist function supports.

When the vehicle is immovable as described above in the situations in which the processor 290 instructs that the maximum torque supported by the remote parking assist function be output, the processor 290 may notify the remote control device 100 of the immovable state of the vehicle. In other words, when the vehicle is immovable with the remote parking assist function enabled, the processor 290 may transmit notification of the immovable state of the vehicle to the remote control device 100 via the communication device 210.

The processor 290, when receiving an additional-torque control command from the remote control device 100, may generate additional torque according to the additional-torque control command received. Referring to FIG. 3, the processor 290 may control the drive controller 270 of the vehicle with the output torque (the maximum torque) calculated based on the road grade "a", and when detecting that the vehicle is immovable at the point where the road grade is changed from "a" to "b", the processor 290 may notify the remote control device 100 of the immovable state of the vehicle. The processor 290, when receiving an additional-torque control command corresponding to a torque deficiency from the remote control device 100, may control the drive controller 270 to output additional torque that corresponds to the torque deficiency.

Figure 4:
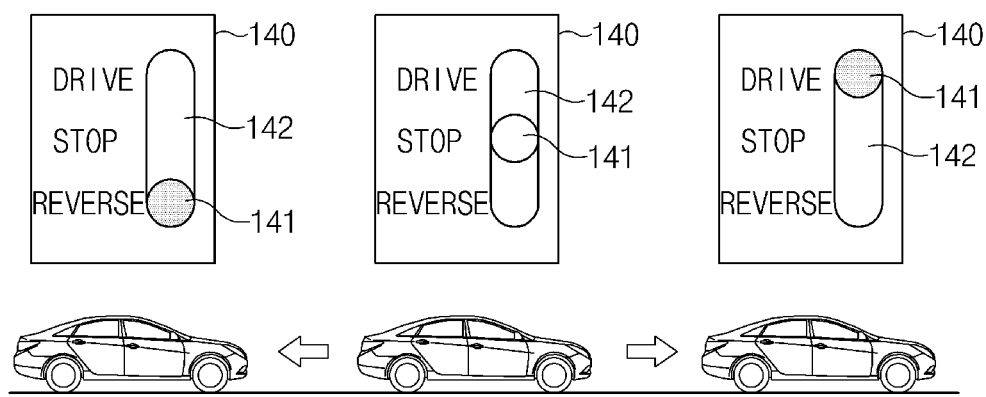
FIG. 4 is a view illustrating a user interface in normal operation of remote parking control according to an embodiment of the present disclosure.
Figure 5A:
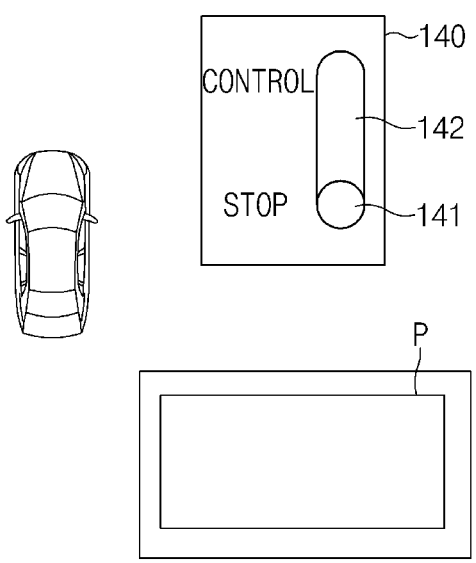
FIGS. 5A and 5B are views illustrating a user interface in normal operation of remote parking control according to another embodiment of the present disclosure.
Figure 5B:
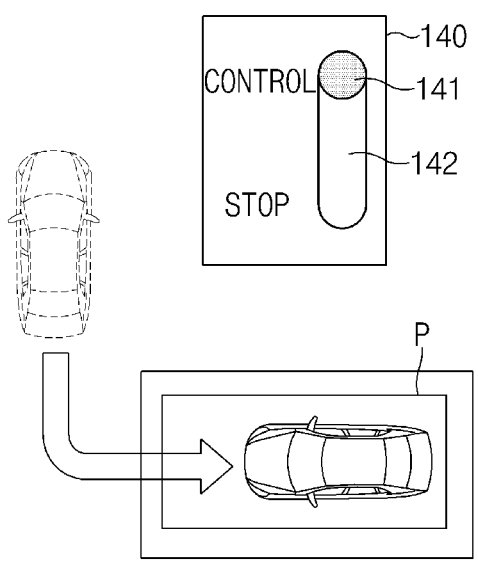

FIG. 4 is a view illustrating a user interface in normal operation of remote parking control according to an embodiment of the present disclosure. FIGS. 5A and 5B are views illustrating a user interface in normal operation of remote parking control according to another embodiment of the present disclosure.

Referring to FIG. 4, when the remote parking assist function is turned on, the processor 150 of the remote control device 100 may display, on the display 140, a user interface 141 and 142 for remote forward or backward movement control. At this time, the slide object 141 of the user interface may be located at the center (the "stop" position) of the slide bar 142. Thereafter, the processor 150 may move the slide object 141 on the slide bar 142 in response to a user input. When the slide object 141 moves along the slide bar 142 and reaches the "drive" position, the processor 150 may transmit a drive command to the remote parking assist system 200. The remote parking assist system 200 may control the drive controller 270 according to the control command transmitted from the remote control device 100 to control the torque of the power source.

When the slide object 141 slides to the "reverse" position on the slide bar 142 according to a user operation, the processor 150 may transmit a reverse command to the remote parking assist system 200 to move the vehicle backward.

As illustrated in FIG. 5A, when a target parking space P is set by the user, the processor 290 of the remote parking assist system 200 may notify the remote control device 100 of the target parking space P and may generate a parking path to the target parking space P. When the target parking space P is set, the processor 150 of the remote control device 100 may switch the user interface for remote forward or backward movement control to a user interface for remote parking control and may display the user interface for remote parking control on the display 140. In other words, the processor 150 may replace the control commands on the slide bar 142 for the respective positions with "control" and "stop" commands and may locate the slide object 141 at the "stop" position.

When the slide object 141 moves to the "control" position on the slide bar 142 as illustrated in FIG. 5B, the processor 150 may transmit a parking command to the remote parking assist system 200. The processor 290, when receiving the parking command from the remote control device 100, may control the vehicle controller 250 to 280 along the generated parking path to park the vehicle in the target parking space P.

The processor 150 may differently process the color of the slide object 141 according to the position of the slide object 141 on the slide bar 142.

Figure 6:
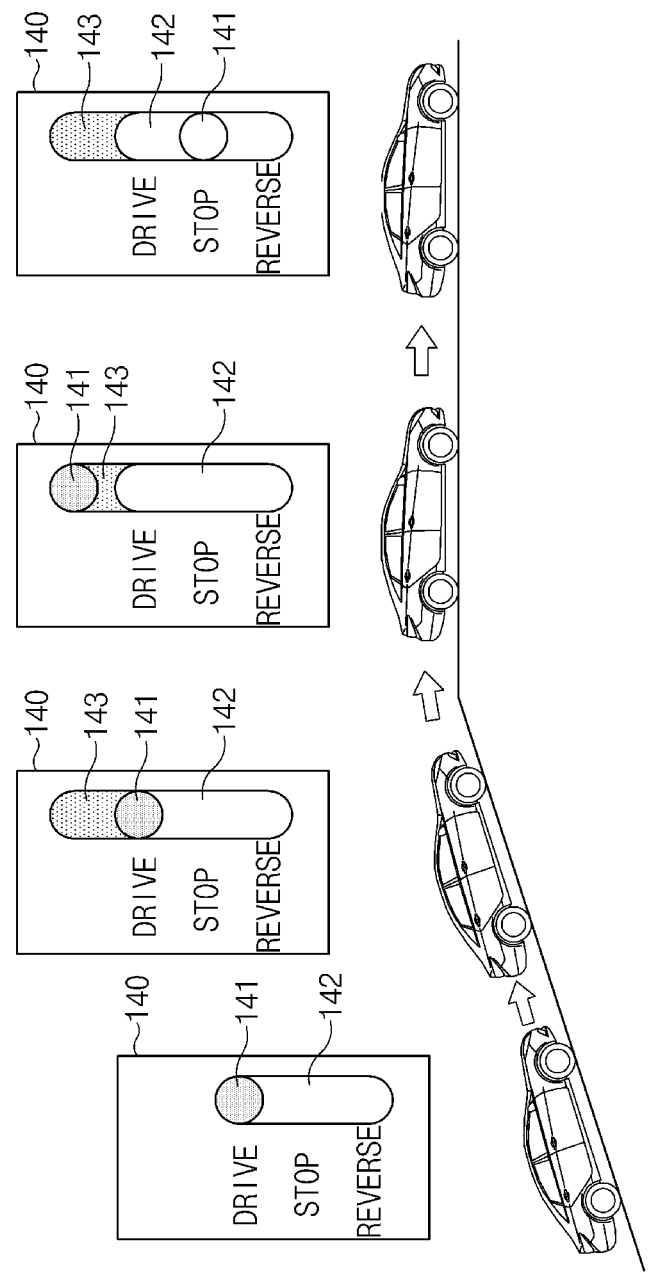
FIG. 6 is a view illustrating a user interface in an immovable state according to an embodiment of the present disclosure.
Figure 7A:
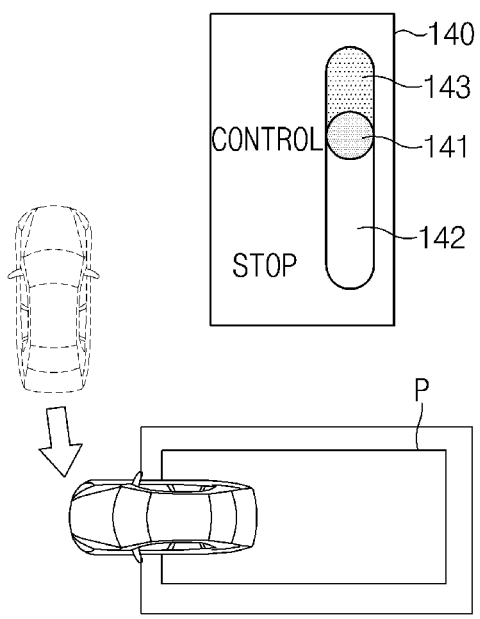
FIGS. 7A to 7C are views illustrating a user interface in an immovable state according to another embodiment of the present disclosure.
Figure 7B:
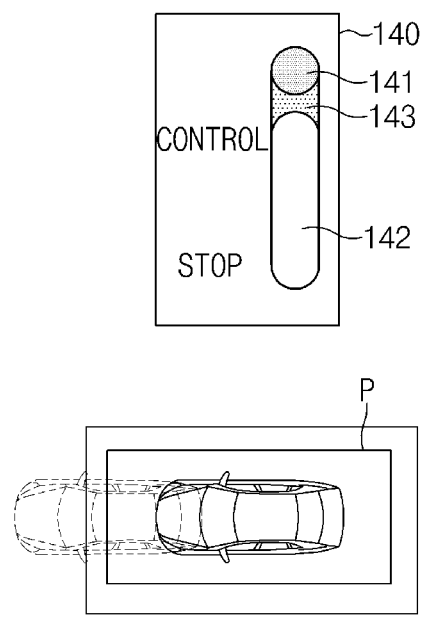
Figure 7C:
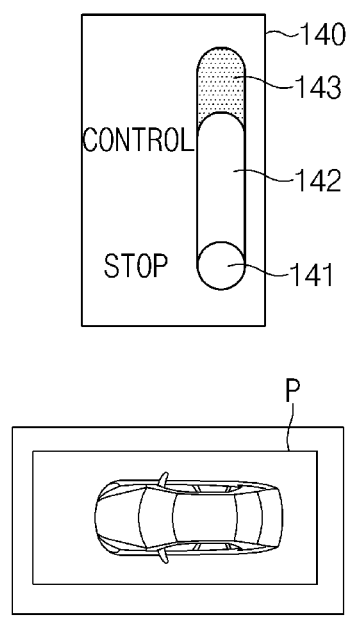

FIG. 6 is a view illustrating a user interface in an immovable state according to an embodiment of the present disclosure. FIGS. 7A to 7C are views illustrating a user interface in an immovable state according to another embodiment of the present disclosure.

As illustrated in FIG. 6, when remotely controlling a forward movement of the vehicle, the processor 290 of the remote parking assist system 200 may allow the power source to output torque according to a drive command from the remote control device 100, but when the vehicle is immovable, the processor 290 may notify the remote control device 100 of the immovable state of the vehicle. The processor 150 of the remote control device 100 may extend a region 143 of the slide bar 142 in the longitudinal direction of the slide bar 142 according to the predetermined setting information. When the user slides the slide object 141 into the extended region 143, the processor 150 may transmit a control command (an additional-torque control command) corresponding to the position of the slide object 141 to the remote parking assist system 200.

The remote parking assist system 200 may control the drive controller 270 according to the additional-torque control command, which is transmitted from the remote control device 100, to adjust the torque output of the power source, thereby controlling the vehicle's behavior.

Referring to FIG. 7A, the processor 290 of the remote parking assist system 200 may park the vehicle in the target parking space P according to a control command from the remote control device 100. When the vehicle is immovable during parking, the processor 290 may notify the remote control device 100 of the immovable state of the vehicle. The processor 150 of the remote control device 100 may extend the sliding range 143 of the slide object 141 to enable the user to control additional torque. When the slide object 141 slides into the extended sliding range 143 as illustrated in FIG. 7B, the processor 150 may instruct the remote parking assist system 200 to output the additional torque.

The remote parking assist system 200 may control the drive controller 270 according to the instruction of the remote control device 100 to generate the additional torque. The processor 150 of the remote control device 100 may provide, to the remote parking assist system 200, the amount of additional torque corresponding to the position of the slide object 141 in the extended region 143 of the slide bar 142.

When the vehicle is completely parked in the target parking space P, the user may operate the slide object 141 to locate the slide object 141 at the "stop" position of the slide bar 142, and the remote control device 100 may transmit a stop command to the remote parking assist system 200 in response to the user input (see FIG. 7C). The processor 290 of the remote parking assist system 200 may control the brake controller 260 to stop the vehicle.

Figure 8:
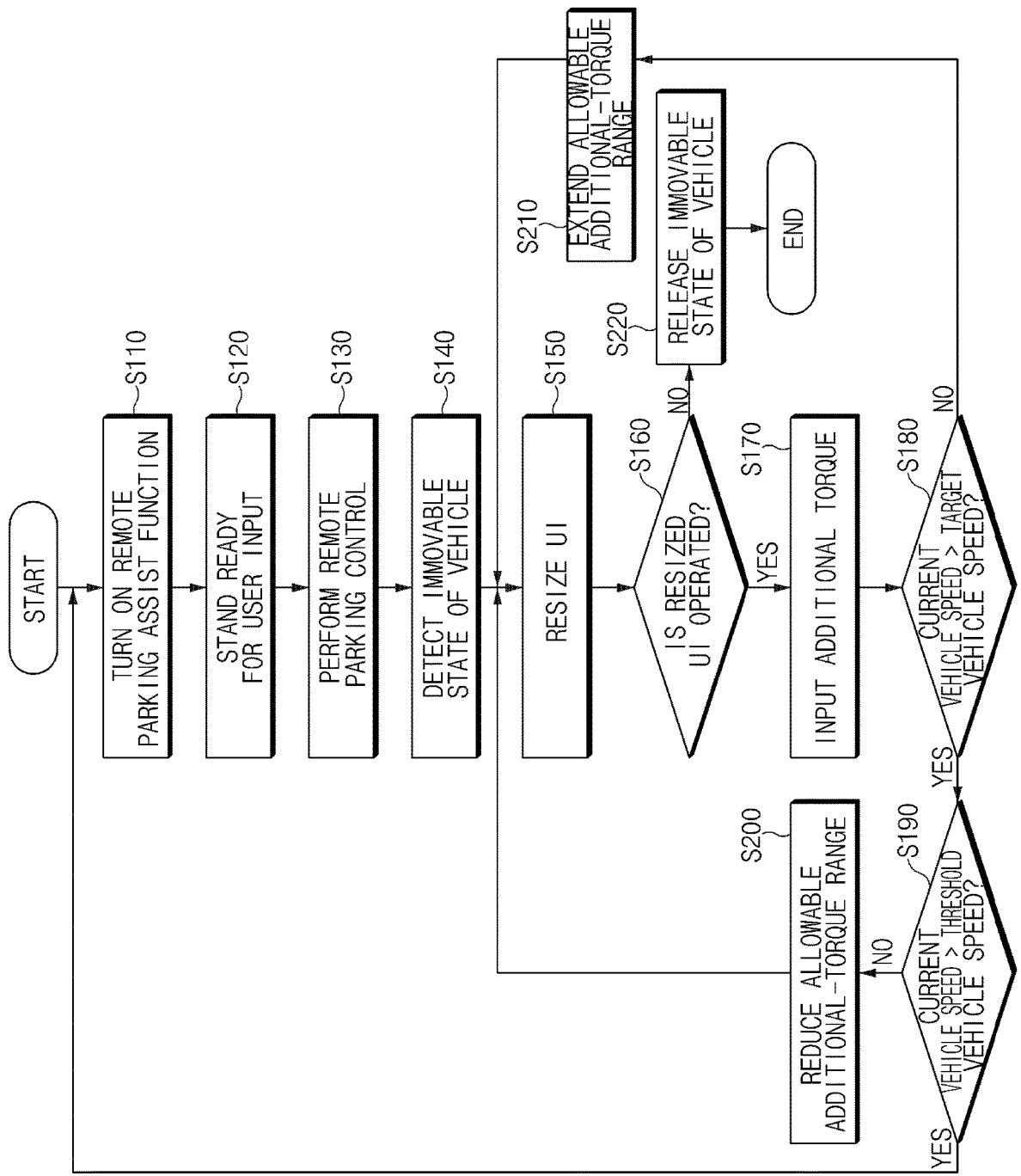
FIG. 8 is a flowchart illustrating a remote parking control method according to an embodiment of the present disclosure.

FIG. 8 is a flowchart illustrating a remote parking control method according to an embodiment of the present disclosure.

Referring to FIG. 8, the remote parking assist system 200 may turn on the remote parking assist function (Step S110). The remote parking assist system 200 may turn on or off the remote parking assist function in response to a control signal according to an operation of a remote parking assist function on/off switch included in the vehicle or the user input device 130 of the remote control device 100.

When the remote parking assist function is turned on, the remote parking assist system 200 may stand by until a user input is received (Step S120). The remote parking assist system 200 may stand by until receiving a command that instructs that the remote parking assist function be operated.

The remote parking assist system 200 may perform remote parking control in response to the user input (Step S130). When receiving, from the remote control device 100, a control command (e.g., a drive, reverse, control, or stop command) that is related to the remote parking control, the remote parking assist system 200 may control the steering controller 250, the brake controller 260, the brake controller 270, and/or the transmission controller 280 according to the received control command to control the vehicle's behavior.

The remote parking assist system 200 may detect an immovable state of the vehicle during the remote parking control (Step S140). The remote parking assist system 200 may output maximum torque in response to the user input. However, when the vehicle is immovable, the remote parking assist system 200 may transmit, to the remote control device 100, a notification message to notify the immovable state of the vehicle. The remote parking assist system 200 may measure the current vehicle speed via the vehicle sensor 220.

The remote control device 100 may resize the components of the UI when receiving the notification of the immovable state of the vehicle from the remote parking assist system 200. The remote control device 100 may extend the slide bar 142 of the UI by a preset extension region in the longitudinal direction of the slide bar 142.

The remote control device 100 may determine whether the resized UI is operated (Step S160). When the slide object 141 moves into the extended region of the slide bar 142, the remote control device 100 may detect the position of the slide object 141 in the extended region.

When the resized UI is operated, the remote control device 100 may transmit an additional-torque control command to the remote parking assist system 200 to control the output of additional torque (Step S170). The remote control device 100 may provide, to the remote parking assist system 200, the amount of additional torque corresponding to the position of the slide object 141 in the extended region. The remote parking assist system 200 may control the drive controller 270 according to the instruction of the remote control device 100 to allow the power source to additionally generate torque corresponding to the amount of additional torque.

The processor 290 of the remote parking assist system 200 may compare the current vehicle speed and a target vehicle speed (Step S180). During the control of the additional torque output, the processor 290 may determine whether the current vehicle speed exceeds the target vehicle speed. Here, the target vehicle speed may be a default value.

When the current vehicle speed exceeds the target vehicle speed, the processor 290 of the remote parking assist system 200 may compare the current vehicle speed and a threshold vehicle speed (Step S190). The processor 290 may determine whether the current vehicle speed exceeds the threshold vehicle speed. The threshold vehicle speed may be a maximum vehicle speed that the remote parking assist function supports, and may be determined (set) in advance.

When the current vehicle speed exceeds the threshold vehicle speed, the processor 290 of the remote parking assist system 200 may determine that the vehicle is in a dangerous situation. Therefore, the processor 290 may stop the vehicle and may disable the remote parking assist function. The processor 290 may control brake pressure via the brake controller 260 to stop the vehicle.

When the determination result in step S190 shows that the current vehicle speed is lower than or equal to the threshold vehicle speed, the processor 290 may instruct the remote control device 100 to reduce an allowable additional-torque range (Step S200). The remote control device 100 may reduce the extended region of the slide bar 142 according to the instruction of the remote parking assist system 200 and may display the reduced region on the display 140.

When the determination result in step S180 shows that the current vehicle speed is lower than or equal to the target vehicle speed, the processor 290 may instruct the remote control device 100 to extend the allowable additional-torque range (Step S210). The processor 150 of the remote control device 100 may additionally extend the extended region of the slide bar 142 according to the instruction of the remote parking assist system 200.

When the determination result in step S160 shows that the resized UI is not operated, the remote parking assist system 200 may release the immovable state of the vehicle (step S220). The remote control device 100 may release the extended region of the slide bar 142.

Figure 9A:
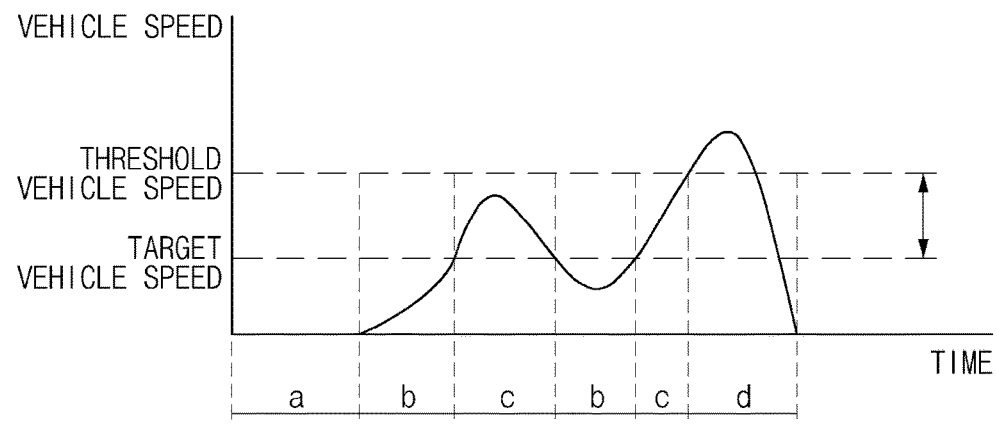
FIGS. 9A and 9B are views illustrating remote parking control according to an embodiment of the present disclosure.
Figure 9B:
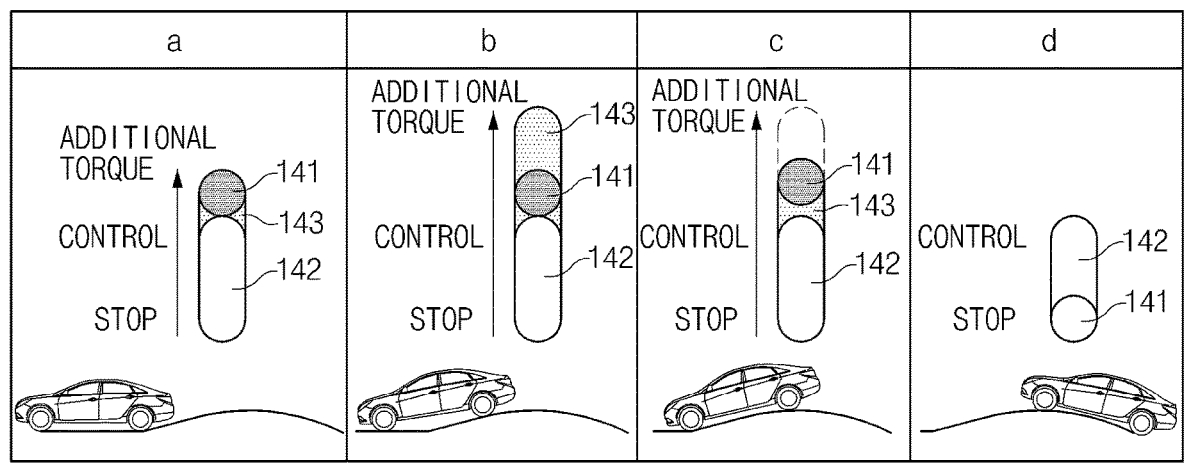

FIGS. 9A and 9B are views illustrating remote parking control according to an embodiment of the present disclosure.

When the current vehicle speed is 0 km/h while the remote parking assist function is enabled, the remote parking assist system 200 may notify the remote control device 100 of the immovable state of the vehicle. The remote control device 100 may extend the slide bar 142 of the UI by the preset extension region 143 in the longitudinal direction of the slide bar 142 (Section a). When the slide object 141 moves to the extended region 143 of the slide bar 142, the remote control device 100 may transmit, to the remote parking assist system 200, a control command that instructs that additional torque be output. The remote parking assist system 200 may control the output of the additional torque according to the instruction of the remote control device 100 and may determine whether the current vehicle speed exceeds the target vehicle speed. When the current vehicle peed is lower than or equal to the target vehicle speed, the remote parking assist system 200 may instruct the remote control device 100 to extend the allowable additional-torque range. The remote control device 100 may additionally extend the extended region 143 of the slide bar 142 according to the instruction of the remote parking assist system 200 (Section b).

When the slide object 141 moves into the additionally extended region 143 of the slide bar 142, the remote control device 100 may transmit, to the remote parking assist system 200, a control command that instructs that additional torque matching the position of the slide object 141 be output. The remote parking assist system 200 may control the vehicle's behavior according to the control command transmitted from the remote control device 100. When the current vehicle speed exceeds the target vehicle speed and is lower than or equal to the threshold vehicle speed, the remote parking assist system 200 may instruct the remote control device 100 to reduce the allowable additional-torque range. The remote control device 100 may reduce the additionally extended region 143 of the slide bar 142 according to the instruction of the remote parking assist system 200 and may display the reduced region on the display 140 (Section c).

When the current vehicle speed exceeds the threshold vehicle speed, the remote parking assist system 200 may immediately stop the vehicle (Section d). The remote control device 100 may release the extended region 143 of the slide bar 142 according to an instruction of the remote parking assist system 200.

According to the embodiments of the present disclosure, a driver can control torque output of the power source via the remote control device when the vehicle is immovable while the remote parking assist function is enabled.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A remote control device comprising: a user input device configured to receive a user input;
   a display configured to display a user interface for controlling torque of a power source of a vehicle;
   a communication device in wireless communication with a remote parking assist system; and
   a processor configured to operate the user interface in response to the user input and to transmit a control signal according to an operation of the user interface to the remote parking assist system, wherein the processor resizes a component of the user interface and displays the resized component when the vehicle is immovable even though the power source outputs a maximum torque supported by a remote parking assist function while the remote parking assist system is in operation.

2. The remote control device of claim 1, wherein the user interface includes: a slide object; and a slide bar configured to guide a sliding range of the slide object.

3. The remote control device of claim 2, wherein the processor extends the sliding range by an extension region in a longitudinal direction of the slide bar when the vehicle is immovable while the remote parking assist system is in operation.

4. The remote control device of claim 3, wherein the processor resizes the extension region based on a current speed of the vehicle.

5. The remote control device of claim 4, wherein the processor additionally extends the extension region when the current speed of the vehicle is lower than or equal to a target speed.

6. The remote control device of claim 4, wherein the processor reduces the extension region when the current speed of the vehicle exceeds a target speed and is lower than or equal to a threshold speed.

7. The remote control device of claim 4, wherein the processor releases the extension region when the current speed of the vehicle exceeds a threshold speed.

8. The remote control device of claim 3, wherein the processor moves the slide object into the extension region in response to the user input and transmits, to the remote parking assist system, a control command which instructs output of additional torque that matches the corresponding position of the slide object.

9. A remote parking assist system comprising:
   a communication device in wireless communication with a remote control device;
   a vehicle sensor configured to detect information about surroundings of a vehicle;
   a vehicle controller configured to control behavior of the vehicle; and
   a processor configured to transmit notification of an immovable state of the vehicle to the remote control device and to control the behavior of the vehicle according to a control signal transmitted from the remote control device when the vehicle is immovable even though a power source of the vehicle outputs a maximum torque supported by a remote parking assist function during autonomous parking based on the information about the surroundings, wherein the remote control device resizes a component of a user interface for controlling torque of the power source of the vehicle when receiving the notification of the immovable state of the vehicle.

10. The remote parking assist system of claim 9, wherein the vehicle sensor includes an ultrasonic sensor, a wheel speed sensor, a wheel pulse sensor, and a camera.

11. The remote parking assist system of claim 9, wherein the processor determines a control range of the user interface according to a current speed of the vehicle.

12. The remote parking assist system of claim 9, wherein the processor immediately stops the vehicle and releases the immovable state of the vehicle when a current speed of the vehicle exceeds a threshold speed.

13. A method for controlling a remote parking assist system, the method comprising steps of:
   recognizing, by a processor, an immovable state of a vehicle even though a power source of the vehicle outputs a maximum torque supported by a remote parking assist function during an operation of the remote parking assist system and transmitting notification of the immovable state of the vehicle to a remote control device;
   resizing, by the processor, a component of a user interface for controlling torque of the power source of the vehicle by the remote control device;
   transmitting, by the processor, a control signal according to an operation of the resized user interface to the remote parking assist system by the remote control device; and
   controlling, by the processor, behavior of the vehicle by adjusting the torque of the power source according to the control signal by the remote parking assist system.

14. The method of claim 13, wherein the step of resizing the component of the user interface includes:

extending a slide bar of the user interface by an extension region in a longitudinal direction of the slide bar by the remote control device, wherein the user interface includes a slide object that moves along the slide bar.

15. The method of claim 14, further comprising a step of:

comparing a current speed of the vehicle with a target vehicle speed and a threshold vehicle speed by the remote parking assist system after the step of controlling the behavior of the vehicle.

16. The method of claim 15, wherein the remote control device reduces the extension region when the current speed of the vehicle exceeds the target vehicle speed and is lower than or equal to the threshold vehicle speed.

17. The method of claim 15, wherein the remote control device releases the extension region when the current speed of the vehicle exceeds the threshold vehicle speed.

18. The method of claim 15, wherein the remote control device additionally extends the extension region when the current speed of the vehicle is lower than or equal to the target vehicle speed.

19. The method of claim 15, wherein the step of controlling the behavior of the vehicle includes:

instructing the remote parking assist system to output an amount of additional torque matching a position of the slid object by the remote control device when the slide object is located in the extension region.

20. The method of claim 13, further comprising a step of:

releasing the immovable state of the vehicle by the remote parking assist system when the resized user interface is not operated after the step of resizing the component of the user interface.

* * * * *